United States Patent [19]

Budris

[11] Patent Number: 5,267,798
[45] Date of Patent: Dec. 7, 1993

[54] BEARING ASSEMBLY

[75] Inventor: Allan R. Budris, Parsippany, N.J.

[73] Assignee: ITT Corporation, New York, N.Y.

[21] Appl. No.: 962,448

[22] Filed: Oct. 16, 1992

[51] Int. Cl.⁵ .................. F16C 33/02; F16C 33/10
[52] U.S. Cl. .................. 384/278; 384/282; 384/293
[58] Field of Search ........ 384/276, 278, 279, 282–284, 384/286, 293, 297, 300, 322, 905

[56] References Cited

U.S. PATENT DOCUMENTS

| | | | |
|---|---|---|---|
| 1,936,894 | 11/1933 | Whiteley | 384/293 X |
| 3,380,843 | 4/1968 | Davis | 384/905 X |
| 3,590,957 | 7/1971 | Campbell | 384/286 X |
| 3,938,868 | 2/1976 | VanWyk | 384/278 |
| 4,699,573 | 10/1987 | Petrie et al. | 384/905 X |
| 4,869,603 | 9/1989 | Melzer et al. | 384/278 X |

Primary Examiner—Thomas R. Hannon
Attorney, Agent, or Firm—Menotti J. Lombardi

[57] ABSTRACT

Strips of polytetrafluoroethylene (i.e., Teflon) are interposed, equally spaced apart, between the journal and sleeve, and journal and collar of a bearing assembly to provide lubrication thereat. The Teflon strips are fibrous and porous, and compressibly collapsible therefor, to insure that thermal expansion of any one thereof will not unduly load the bearing assembly. The bearing material has surface voids in which to trap and retain the Teflon which is wiped onto the contact surfaces.

19 Claims, 3 Drawing Sheets

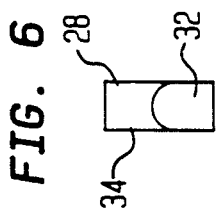
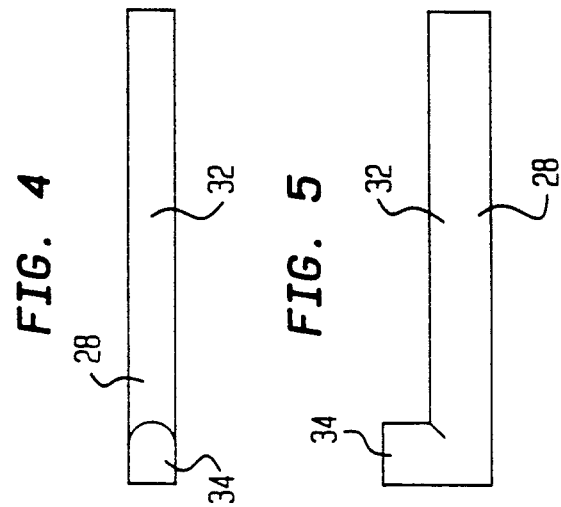
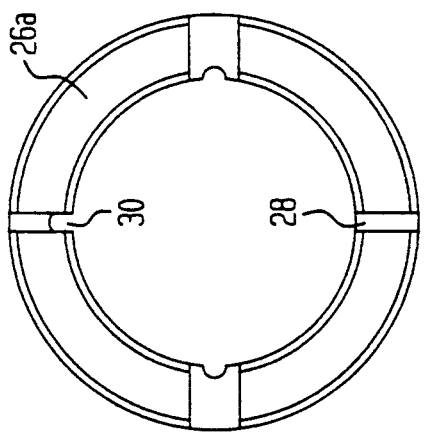
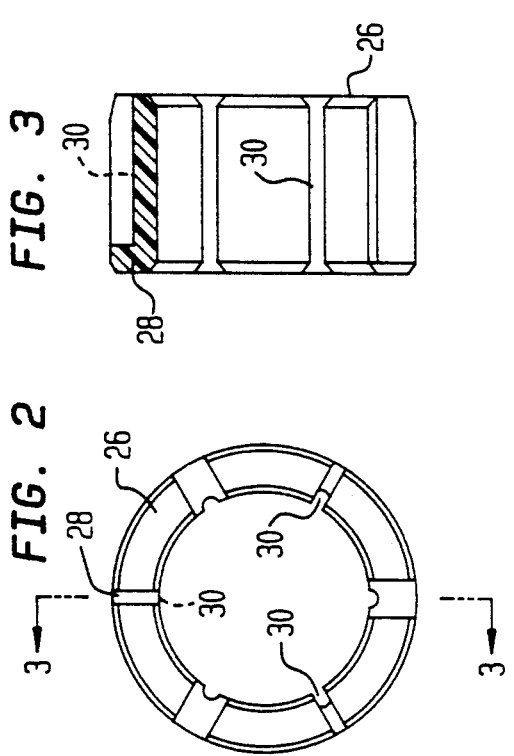

BEARING ASSEMBLY

BACKGROUND OF THE INVENTION

This invention pertains to bearing assemblies, in which to journal shafts, and in particular to lubrication means for the relatively movable components of bearing assemblies.

Long-life, hard-material journals and thrust collars, in bearing assemblies, which run against sleeves or shafts of same or similarly hard material, such as are required for handling abrasives, and high bearing energy loads in highly corrosive environments, i.e., journals, collars and sleeves of solid alpha sintered carbide, have a very poor dry run capability. Such bearing assemblies, used commonly in chemical, magnetic drive pumps, can experience premature, and quick bearing failures, during upset periods which result in lubrication starvation of the assemblies. Further, most magnetic drive pumps exacerbate a bearing temperature rise problem, during periods of dry running, because of additional heat from eddy currents generated in the typical metallic containment shell in which the bearings thereof are enclosed. When run dry, the bearings fail so quickly that any monitoring equipment or instrumentation therefor can not respond rapidly enough to halt the pump before serious damage is sustained by the bearings. These hard bearings, of solid alpha sintered silicon carbide, in addition, require very small running clearances, between the journal and the sleeve, i.e., approximately 0.0015 inch, per inch of sleeve diameter, to perform effectively. Consequently, movement of the sleeve within the journal is quite limited before surface contact loads are generated within the bearing. Any forces exerted against the journal or sleeve, by the lubrication means, must, therefore, not excessively overload the bearing.

Known prior art, as exemplified by U.S. Pat. No. 4,869,603, issued to Rudolf Meltzer, et al, on Sep. 26, 1989, for a Bearing for Cylinders of Printing Presses and Method of Making It, discloses the use of polytetrafluoroethylene as a lubricant for the bearing. Such is beneficial, in that polytetrafluoroethylene has a much higher thermal expansion rate than has the aforesaid bearing material, solid alpha sintered silicon carbide. When the bearing heats up, the aforesaid lubricant expands and wipes onto the bearing sleeve or thrust collar, coating the same, and resulting in the lubricant, polytetrafluoroethylene, running against itself.

As a lubricant, polytetrafluoroethylene, known commonly by its trade mark Teflon, offers the aforesaid benefit of coating the mating component and running upon itself, but in a bearing assembly requiring small running clearances, the Teflon expansion adds loading to the bearing assembly. Even the employment of individual lengths of Teflon, spaced apart within the relatively movable bearing components, as set forth in the aforesaid U.S. Pat. No. 4,869,603, would unduly load a bearing assembly which has small running clearances. Thermal expansion of the strips would have no means for any one thereof to yield due to expansion of others thereof. Too, in that the subject bearing will manifest diverse temperatures, circumferentially, the lengths or strips of Teflon can not adjust therefor, as to permit one strip to expand less than another, to insure against unduly loading the bearing. Further, the Teflon which is wiped onto the smooth, hard polished bearing surfaces for lubrication, will wear off with time and must, therefore, be reapplied during each period of heating from dry bearing operation. This would allow the bearing surfaces to wear until the Teflon is reapplied.

What has been needed is a lubricant means for a bearing assembly which is not met with the aforesaid difficulties, and is efficiently useful in bearing assemblies having small running clearances, and which assemblies are fabricated from hard materials.

SUMMARY OF THE INVENTION

It is an object of this invention to meet the aforesaid need for a superior lubricant in a bearing assembly.

Particularly, it is an object of this invention to set forth a bearing assembly comprising a hardened shaft, or a sleeve for journalling a shaft therewithin; a journal bushing circumscribing, and concentric with, said hardened shaft or sleeve; and thermally-expansive lubrication means interposed between said shaft and bushing or said sleeve and said bushing; wherein said lubrication means comprises means, responsive to circumferentially diverse temperature conditions of said bearing assembly, for effecting correspondingly diverse expansion of said lubrication means.

BRIEF DESCRIPTION OF THE DRAWINGS

FIG. 2 is a plan view of the journal bushing of FIG. 1.

FIG. 3 is a cross-sectional view taken along section 3—3 of FIG. 2.

FIGS. 4, 5 and 6 are plan, side elevational, and end views, respectively, of the strip of lubricating material used in the bearing assembly of FIG. 1.

FIG. 7 is a plan view of an alternative embodiment of the journal bushing.

DETAILED DESCRIPTION OF THE PREFERRED EMBODIMENT

Figure 1:
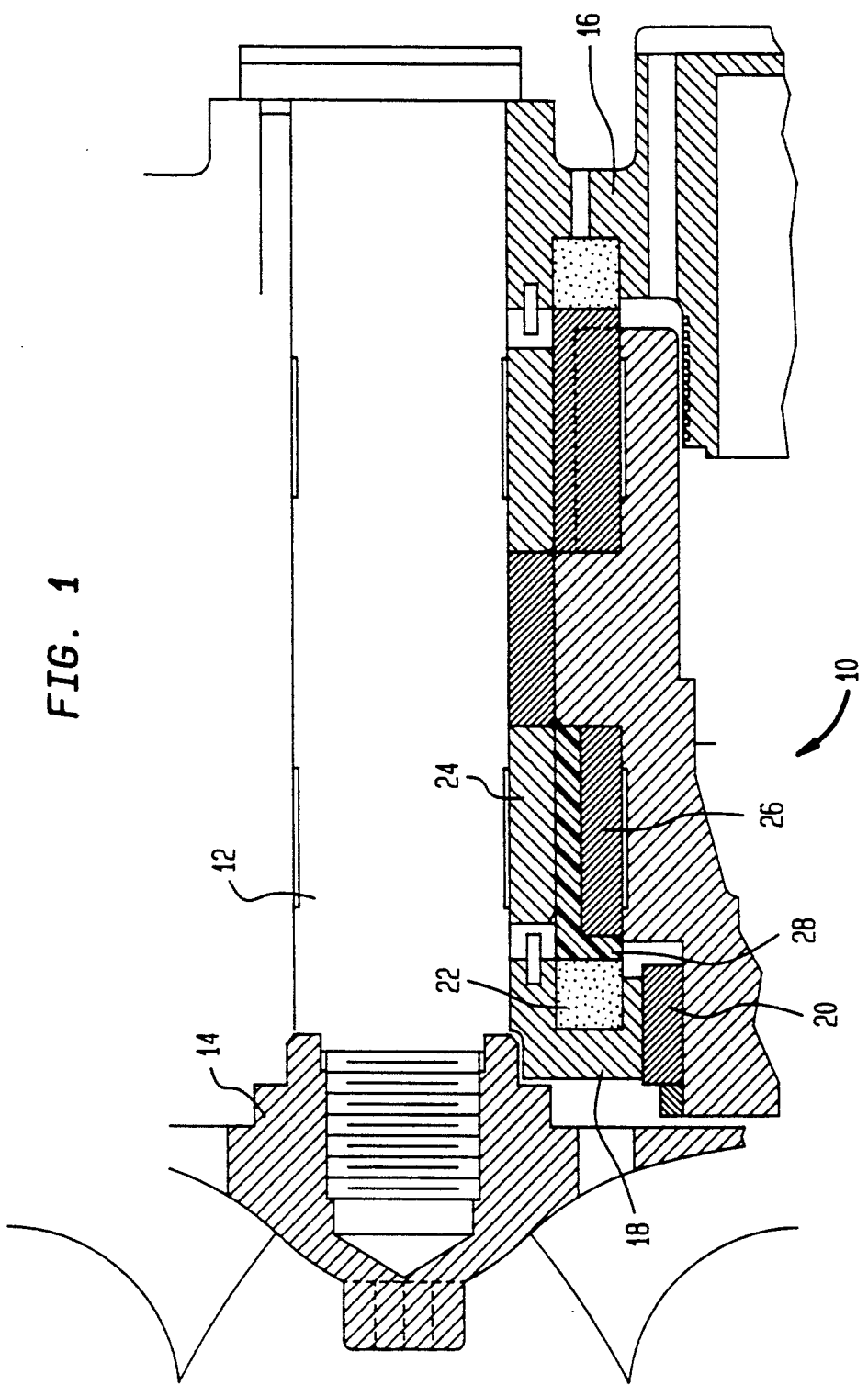
FIG. 1 is an axial view of a portion of a magnetic drive pump, half thereof being cross-sectioned, representing an impeller, shaft, and bearing assembly, the latter incorporating an embodiment of the invention.

As shown in FIG. 1, the novel bearing assembly 10 supports therewithin the shaft 12 of a magnetic drive pump, the shaft having an impeller 14 coupled thereto, and a shaft driver 16 arranged at the inner (right-hand) end of the shaft 12. The bearing assembly 10 comprises a bearing holder 18, set within an annulus 20, and a thrust collar 22 confined within the holder 18. A bearing sleeve 24 encircles the shaft 12, journalling the latter therewithin, and a bearing journal bushing 26, concentric with the sleeve 24, circumscribes the sleeve 24. "L"-shaped strips 28, of polytetrafluoroethylene (i.e., Teflon), are interposed between the journal bushing 26 and sleeve 24, and the journal bushing 26 and thrust collar 22 (only one of the strips is shown). The axial length of the strips 28 are arranged between the journal bushing 26 and sleeve 24, and the radial limb of the strips 28 are set between the journal bushing 26 and the collar 22.

FIGS. 2 and 3 illustrate the journal bushing 26, and show three axially- and radially-formed grooves 30 therein which nest the strips 28 therein. One of the grooves 30, at the top of FIGS. 2 and 3, has a strip 28 in place therein. The Teflon strip 28 is shown in FIGS. 4, 5 and 6, the same having an axial length 32, and a radial limb 34.

The thermal expansion rate of Teflon is much higher than the expansion rate of the journal bushing 26, sleeve 24 and thrust collar 22, said journal bushing, sleeve and collar being formed of solid alpha sintered silicon carbide. Consequently, the Teflon strips 28 expand out of the grooves 30, when the bearing assembly 10 heats up, and coatingly wipes itself onto the sleeve 24 and collar 22. Part of the thus-transferred Teflon coating wipes back onto the inner bore of the journal bushing 26 and works against the strips 28 from whence the very coating originated, As a consequence, the arrangement is self-lubricating, in that it results in Teflon running against Teflon.

The aforesaid is not significantly different, as described thus far, than the arrangement disclosed in the cited U.S. Pat. No. 4,869,603. However, the invention sets forth a novel improvement not anticipated by or suggested in the prior art. The strips 28, according to the invention, are formed of fibrous and porous Teflon. Commonly, a bearing assembly, such as assembly 10, will manifest diverse temperature conditions circumferentially thereabout. In such circumstances, having solid Teflon strips arrayed about the journal bushing 26, each will expand and unduly load the bearing assembly. By the novel employment of porous strips 28, however, the strips expand out of the grooves 30, but will compress due to the voids therein. In that the voids will accommodate a collapsing of the strips 28, the combination of the strips 28, arrayed about the journal bushing 26, will not unduly load the bearing assembly 10. Met with such circumferentially diverse temperature conditions of the bearing assembly 10, the array of strips 28, then, resultingly effect correspondingly diverse expansion of the strips 28.

As represented in FIGS. 2 and 3, the journal bushing 26 has three grooves 30 formed therein, the same equally spaced apart about the center of the journal bushing. By this arrangement, the strips 28 of lubricating Teflon are generally balanced about the journal bushing 26. As the porous strips 28 expand to make contact with the sleeve 24, over expansion is neutralized, not only by the opposing strips 28, but by a partial collapse of the voids in the strips. It is of no concern, if one or two of the strips 28 expands more than the third thereof, in that the Teflon is porous, the compressibility or collapse-ability thereof will insure that the assembly 10 will not be overly loaded.

FIG. 7 depicts an alternative embodiment of a journal bushing 26a, the same having but two grooves 30 formed therein for the strips 28. As the grooves are on opposite sides of the center of the journal bushing 26a, the lubricating Teflon strips 28 will be generally balanced against each other, and the aforesaid benefits thereof will obtain in the use of this embodiment as well.

As noted in the aforesaid, the journal bushing 26, sleeve 24 and thrust collar 22 are formed of solid alpha sintered silicon carbide, in a first embodiment. In an alternative embodiment, the invention contemplates the use of controlled porosity alpha sintered silicon carbide (available from the Carborundum Corp., Niagara Falls, N.Y., under the trade name: Hexaloy SP-D), in lieu of the solid alpha sintered silicon carbide, for the journal bushing 26, sleeve 24, and thrust collar 22 material. This product has an array of voids in the surfaces thereof which will trap and hold some of the Teflon which has been wiped onto such surfaces, and prevent it from being easily wiped away. This will improve subsequent dry running of the bearing assembly 10 since, after a first dry run episode, some Teflon, snagged or captured by the voids in the controlled porosity alpha sintered silicon carbide, will protect the surfaces. Consequently, there will occur no periods of non-lubrication when later dry run, waiting for the Teflon strips 28 to expand again out of their grooves 30 and re-wipe the relevant surfaces to provide lubrication.

Figure 8:
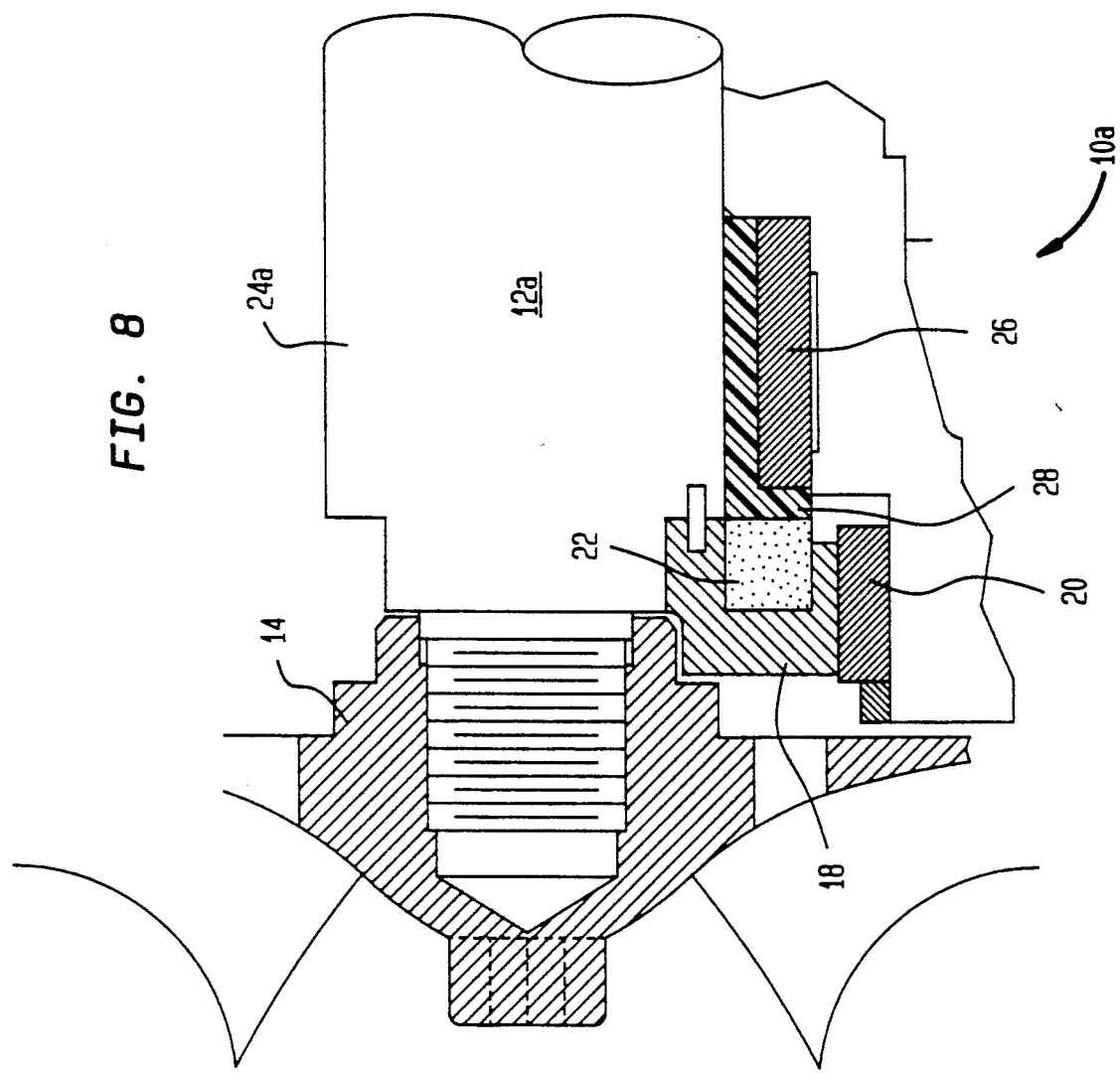
FIG. 8 is a view like that of FIG. 1 in which, however, there is no separate sleeve; instead, the shaft itself is hardened to serve as the separate sleeve.

FIG. 8 depicts an axial view of a portion of a magnetic drive pump, similar to that shown in FIG. 1, except that in this embodiment of the pump, there is no separate sleeve; same or similar index numbers thereon, however, indicate same or similar components as in FIG. 1. In this FIG. 8 embodiment, the bearing assembly 10a, instead of having a separate sleeve 24, has the journal bushing 26 running against portion 24a of the shaft 12a. Portion 24a is normally duly hardened, i.e., coated with a carbide, or other hard coating material, in order that it will serve as a sleeve of the bearing assembly 10a.

The invention provides a dry running capability for a bearing assembly 10 or 10a in a pump, or the like, to buy enough time for monitoring equipment to react to such dry running condition and safely shut down the pump before any bearing damage occurs. It will also allow the end item to have dry running capability for limited periods of time without having to shut down the end item, or having the bearing assembly fail. The invention teaches how to provide dry running capability for any journal bushing, sleeve or thrust bearing material, provided that the thermal expansion rate of the aforesaid components is less than that of the porous Teflon strips 28.

While I have described my invention in connection with specific embodiments thereof, it is to be clearly understood that this is done only by way of example, and not as a limitation to the scope of the invention, as set forth in the objects thereof and in the appended claims.

I claim:

1. A bearing assembly, comprising:
    a sleeve, for journalling a shaft therewithin;
    a journal bushing circumscribing, and concentric with, said sleeve;
    thermally-expansive lubrication means interposed between said sleeve and said journal bushing;
    said lubrication means comprises a plurality of strips of lubricating material responsive to circumferentially diverse temperature conditions of said bearing assembly, for effecting correspondingly diverse expansion of said plurality of strips; and
    at least one of said strips is disposed, between said sleeve and journal bushing, to cause thermal expansion of said one strip to neutralize thermally expansive force exerted, between said sleeve and journal bushing, by another of said strips of said plurality thereof.

2. A bearing assembly, according to claim 1, wherein: said lubricating material is inert.

3. A bearing assembly, according to claim 1, wherein: said lubricating material is fibrous and porous.

4. A bearing assembly, according to claim 1, wherein: said lubricating material is fibrous and porous polytetrafluoroethylene.

5. A bearing assembly, according to claim 1, wherein:

said sleeve is formed of a material having voids for trapping and holding said lubricating material thereon.

6. A bearing assembly, according to claim 1, wherein:
said journal bushing is formed of a material having voids for trapping and holding said lubricating material thereon.

7. A bearing assembly, according to claim 1, wherein:
at least one of said sleeve and journal bushing is formed of a controlled porosity alpha sintered silicon carbide.

8. A bearing assembly, according to claim 1, wherein:
said sleeve and journal bushing have a longitudinal axis; and
said plurality comprises two of said strips, axially disposed, on opposite sides of said axis.

9. A bearing assembly, according to claim 8, wherein:
said journal bushing has a pair of axially-formed grooves, on opposite sides of said axis, in which said two strips are nested.

10. A bearing assembly, according to claim 1, wherein:
said sleeve and journal bushing have a longitudinal axis; and
said plurality comprises but three of said strips, axially disposed, and equally spaced apart about said axis.

11. A bearing assembly, according to claim 10, further including:
a collar disposed at, and confronting, one axial end of said journal bushing;
said strips of said plurality thereof each have a limb interposed between said collar and said journal bushing; and
said journal bushing has three axially-and radially-formed grooves, equally spaced apart about said axis, in which said three strips are nested.

12. A bearing assembly, according to claim 1, wherein:
said sleeve and journal bushing have a longitudinal axis; and further including,
a collar disposed at, and confronting, one axial end of said journal bushing; and wherein
said strips of said plurality thereof each have a limb interposed between said collar and said journal bushing.

13. A bearing assembly, according to claim 12, wherein:
said journal bushing has a pair of axially- and radially-formed grooves, on opposite sides of said axis, in which said one and another strips are nested.

14. A bearing assembly, according to claim 8, wherein:
said collar is formed of a material having voids for trapping and holding said lubricating material thereon.

15. A bearing assembly, according to claim 12, wherein:
said collar is formed of a controlled porosity alpha sintered silicon carbide.

16. A bearing assembly, for use with a rotatable shaft which has at least a portion thereof surface-hardened, comprising:
a journal bushing for journalling said shaft portion therewithin;
thermally-expansive lubrication means for interpositioning thereof between said journal bushing and said shaft portion;
said lubrication means comprises a plurality of strips of lubricating material, responsive to circumferentially diverse temperature conditions of said bearing assembly and said shaft portion, for effecting correspondingly diverse expansion of said plurality of strips; and
at least one of said strips is arranged, relative to said journal bushing, to cause thermal expansion of said one strip to neutralize thermally expansive force exerted, between said journal bushing and said shaft portion, by another of said strips of said plurality thereof.

17. A bearing assembly, according to claim 16, wherein:
said lubricating material is chemically inert.

18. A bearing assembly, according to claim 16, wherein:
said lubricating material is fibrous and porous.

19. A bearing assembly, according to claim 16, wherein:
said lubricating material is fibrous and porous polytetrafluoroethylene.

* * * * *